United States Patent
Zhao et al.

(10) Patent No.: US 11,154,840 B2
(45) Date of Patent: Oct. 26, 2021

(54) INORGANIC OXIDE MATERIAL (71) Applicant: RHODIA OPERATIONS, Paris (FR)

(72) Inventors: Qiang Zhao, Yardley, PA (US); Olivier Larcher, Perigny (FR); Barry W. L. Southward, Philadelphia, PA (US); Francis Francis, Columbia, MD (US); Thomas English, Conshohocken, PA (US); Fabien Ocampo, La Courneuve (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/106,480

(22) PCT Filed: Dec. 23, 2014

(86) PCT No.: PCT/US2014/072129
§ 371 (c)(1),
(2) Date: Jun. 20, 2016

(87) PCT Pub. No.: WO2015/100313
PCT Pub. Date: Jul. 2, 2015

(65) Prior Publication Data
US 2017/0001172 A1 Jan. 5, 2017

Related U.S. Application Data (60) Provisional application No. 61/920,172, filed on Dec. 23, 2013.

(51) Int. Cl.
| | | |
|---|---|---|
| *C01F 7/14* | (2006.01) | |
| *C01F 17/235* | (2020.01) | |
| *C01F 5/02* | (2006.01) | |
| *B01J 23/10* | (2006.01) | |
| *B01D 53/94* | (2006.01) | |
| *B01J 35/10* | (2006.01) | |
| *B01J 23/00* | (2006.01) | |
| *B01J 23/63* | (2006.01) | |
| *B01J 23/40* | (2006.01) | |
| *B01J 37/04* | (2006.01) | |
| *B01J 37/08* | (2006.01) | |
| *B01J 37/03* | (2006.01) | |
| *B01J 37/00* | (2006.01) | |
| *B01J 35/00* | (2006.01) | |

(52) U.S. Cl.
CPC .......... *B01J 23/10* (2013.01); *B01D 53/945* (2013.01); *B01J 23/002* (2013.01); *B01J 23/40* (2013.01); *B01J 23/63* (2013.01); *B01J 35/1014* (2013.01); *B01J 35/1019* (2013.01); *B01J 35/1047* (2013.01); *B01J 37/04* (2013.01); *B01J 37/088* (2013.01); *C01F 5/02* (2013.01); *C01F 7/14* (2013.01); *C01F 17/235* (2020.01); *B01D 2255/2047* (2013.01); *B01D 2255/2065* (2013.01); *B01D 2255/2066* (2013.01); *B01D 2255/2092* (2013.01); *B01D 2255/40* (2013.01); *B01J 35/0006* (2013.01); *B01J 37/0045* (2013.01); *B01J 37/03* (2013.01); *B01J 37/035* (2013.01); *B01J 37/08* (2013.01); *B01J 2523/00* (2013.01); *Y02T 10/12* (2013.01)

(58) Field of Classification Search
None
See application file for complete search history.

(56) References Cited

U.S. PATENT DOCUMENTS

| | | | | |
|---|---|---|---|---|
| 8,043,992 | B2 * | 10/2011 | Hatanaka ............ | B01D 53/945 |
| | | | | 423/594.12 |
| 8,071,498 | B2 | 12/2011 | Aono et al. | |
| 2002/0090512 | A1 * | 7/2002 | Hatanaka ............ | B01D 53/945 |
| | | | | 428/402 |
| 2003/0125202 | A1 * | 7/2003 | Ruwisch ............ | B01D 53/9422 |
| | | | | 502/328 |
| 2006/0043651 | A1 * | 3/2006 | Yamamoto ............... | B01J 23/63 |
| | | | | 264/661 |
| 2009/0149321 | A1 | 6/2009 | Morikawa et al. | |
| 2010/0111789 | A1 | 5/2010 | Fajardie et al. | |
| 2010/0227757 | A1 | 9/2010 | Hatanaka et al. | |
| 2012/0122671 | A1 * | 5/2012 | Polli ................. | B01J 21/12 |
| | | | | 502/263 |
| 2012/0131911 | A1 | 5/2012 | Nakagawa et al. | |
| 2014/0120014 | A1 * | 5/2014 | Del-Gallo ............ | B01D 53/945 |
| | | | | 423/212 |

FOREIGN PATENT DOCUMENTS

| | | | |
|---|---|---|---|
| JP | 2010501346 | A | 1/2010 |
| WO | 2012/067654 | A1 | 5/2012 |
| WO | 2013000684 | * | 1/2013 |

* cited by examiner

*Primary Examiner* — Sheng H Davis
(74) *Attorney, Agent, or Firm* — Osha Bergman Watanabe & Burton LLP (57) ABSTRACT

The present teachings are directed to inorganic oxide materials that include $Al_2O_3$, $CeO_2$, and at least one of MgO and $Pr_6O_{11}$. The present teachings are also directed to catalysts having at least one noble metal supported on these inorganic oxide materials, as well as methods for treating exhaust gases from internal combustion engines using such catalysts.

15 Claims, 2 Drawing Sheets

Figure 2

INORGANIC OXIDE MATERIAL

CROSS-REFERENCE TO RELATED APPLICATIONS

This application is a U.S. national stage entry under 35 U.S.C. § 371 of International Application No. PCT/US2014/072129 filed Dec. 23, 2014, which claims the priority of U.S. Provisional Application No. 61/920,172 filed Dec. 23, 2013. The entire contents of these applications are explicitly incorporated herein by this reference.

BACKGROUND

Internal combustion engines produce exhaust which contains by-products that present known health hazards to human beings, animals and plant life. Pollutants include, for example, unburnt hydrocarbons, carbon monoxide (CO), oxides of nitrogen (NOx) and other residual species, e.g., sulfur-containing compounds. Emission of these pollutants is, to a certain extent, controlled by exhaust catalysts. To be suitable for use, e.g., in vehicle applications, such catalysts must meet stringent requirements with respect to activity (light-off), effectiveness (e.g., responsive to fluctuating exhaust conditions), long-term activity, mechanical integrity, as well as cost effectiveness. Unburnt hydrocarbon, CO and NOx oxide pollutants have been successfully treated using the so-called 'three-way' catalyst. These noble metal containing catalysts are capable of converting a high percentage of pollutants into the less harmful products of carbon dioxide, water (steam) and nitrogen. For example, DE-05 38 30 318 describes the use of noble metals, typically metals of the platinum group, such as platinum, palladium, rhodium and mixtures thereof, as catalytic metals which can effectively convert unburnt hydrocarbons, CO, and NOx oxide pollutants under varying conditions encountered.

However, in order to achieve high levels of conversion, the three-way catalyst must operate under strict limits of exhaust stoichiometry, i.e., a defined air:fuel ratio of 14.65:1 (also referred to as Lambda ($\lambda$)=1). At this stoichiometry, the chemically reducing pollutants, e.g., CO, convert NOx into nitrogen gas. Thus, when the engine is under fuel lean operation, i.e., when the exhaust is oxygen rich, there is insufficient CO to facilitate conversion of NOx, making three-way catalysis inefficient. Moreover, the oxides of sulfur in the exhaust, derived from the combustion of fuel-bound sulfur, are known to poison the noble metals under fuel lean conditions resulting in a further decrease of catalytic effectiveness and durability.

SUMMARY

Despite the fact that pollutants have been successfully treated by contact with multifunctional, noble metal catalysts, there remains a need to provide a material that overcomes the deficiencies of typical catalytic converters and keeps up with increasingly stringent emissions standards. Thus, it is desirable to form a porous inorganic oxide that exhibits improved heat thermal stability, efficient $NO_x$ treatment, improved $NO_x$ storage capacity, efficient treatment of other pollutants (e.g., non-burnt hydrocarbons and carbon monoxides), improved oxygen storage capacity, and/or improved sulfur tolerance.

In a first aspect, present teachings are directed to an inorganic oxide material which includes:
(a) from about 25 to about 90 pbw, typically from about 40 to about 80 pbw, $Al_2O_3$;
(b) from about 5 to about 35 pbw, typically from about 10 to about 30 pbw, $CeO_2$;
(c)(i) from about 5 to about 35 pbw, typically from about 10 to about 30 pbw MgO, or
(c)(ii) from about 2 to about 20 pbw, typically from about 5 to about 15 pbw $Pr_6O_{11}$, or
(c)(iii) from about 5 to about 35 pbw, typically from about 10 to about 30 pbw MgO, and from about 2 to about 20 pbw, typically from about 5 to about 15 pbw $Pr_6O_{11}$; and
(d) optionally, up to about 10 pbw of a combined amount of oxides of one or more dopants selected from transition metals, rare earths, and mixtures thereof.

In some embodiments, the material includes from about 1 to about 10 pbw of an oxide or a mixture of oxides selected from $Y_2O_3$, $La_2O_3$, $Nd_2O_3$ and $Gd_2O_3$. In some embodiments, the material includes from about 1 to about 4 pbw $La_2O_3$. In certain embodiments, the material comprises (a) crystallites including $Al_2O_3$ and at least one oxide selected from MgO and $Pr_6O_{11}$, and (b) crystallites including $CeO_2$.

In a second aspect, the present teachings are directed to an inorganic oxide material which includes:
(a) a porous support structure including $Al_2O_3$;
(b) first crystallites including $CeO_2$ and having an average size after calcining at 1000° C. for 4 hours of less than or equal to 15 nm dispersed on the support structure; and
(c) second crystallites dispersed on the support structure, the second crystallites including:
  (i) magnesium and aluminum composite oxides having an average size after calcining at 1000° C. for 4 hours of less than or equal to 13 nm,
  (ii) praseodymium and aluminum composite oxides having an average size after calcining at 1000° C. for 4 hours of less than or equal to 39 nm, or
  (iii) a combination of (i) and (ii);
wherein the inorganic oxide material has a specific surface area after calcining at 900° C. for 2 hours of greater than or equal to 150 m²/g and a total pore volume after calcining at 900° C. for 2 hours of greater than or equal to 1.0 cc/g.

In some embodiments, the material includes from about 40 to about 80 pbw $Al_2O_3$. In some embodiments, the material comprises from about 10 to about 30 pbw $CeO_2$. In some embodiments, the material comprises from about 10 to about 30 pbw MgO. In some embodiments, the specific surface area of the material after calcining at 900° C. for 2 hours is greater than or equal to about 160 m²/g. In some embodiments, the total pore volume of the material after calcining at 900° C. for 2 hours is greater than or equal to about 1.10 cm³/g.

In some embodiments, the material comprises from about 5 to about 15 pbw $Pr_6O_{11}$. In some embodiments, the specific surface area of the porous support structure after calcining at 900° C. for 2 hours is greater than or equal to about 200 m²/g. In some embodiments, the total pore volume of the porous support structure after calcining at 900° C. for 2 hours is greater than or equal to about 1.50 cm³/g.

In a third aspect, the present teachings are directed to a catalyst that includes one or more noble metals supported on the inorganic oxide material described herein (e.g., as described in the first and second aspects above).

In a fourth aspect, the present teachings are directed to a method for treating an exhaust gas from an internal combustion engine using the catalyst described herein (e.g., as described in the third aspect above). The method generally includes contacting the exhaust gas with the catalyst such that the exhaust gas is treated, e.g., such that the unburnt hydrocarbons, CO, $NO_x$ and/or sulfurous compounds in the exhaust gas is eliminated.

In a fifth aspect, the present teachings are directed to a method for making a porous inorganic composite oxide, comprising:
(a) forming (i) particles including aluminum hydrate and at least one of magnesium hydrate and praseodymium hydrate and (ii) particles including cerium hydrate:
  (1) simultaneously by forming (i) and (ii) in an aqueous medium at a temperature of greater than about 40° C. and a pH of between about 4 and about 10.5, or
  (2) sequentially by forming (i) in an aqueous medium at a temperature of greater than about 40° C., adjusting the pH of the aqueous medium to a pH of from about 4 to about 9 (e.g., from about 4 to about 6), and forming (ii) in the aqueous medium;
(b) calcining the particles to form the porous inorganic composite oxide.

In its various embodiments, the inorganic oxide material described herein provides improved thermal stability, improved $NO_x$ adsorption, efficient $NO_x$ treatment, improved oxygen storage capacity, efficient treatment of other pollutants (e.g., non-burnt hydrocarbons and carbon monoxides), and/or improved sulfur tolerance.

DETAILED DESCRIPTION

As used herein, the term "particulate" refers to shaped particles in the form of powder, beads, extrudate, and the like and isused in reference to cores, supports as well as the resultant supported noble metal products.

As used herein, the term "nanoparticles" means primary particles having a particle diameter of up to about 500 nm, more typically from about 1 to about 100 nm, and even more typically from about 1 to about 50 nm. The relevant particle sizes can be calculated based on x-ray diffraction data or determined by observation using a transmission electron microscope. As used herein, the terminology "primary particle" means a single discrete particles and the terminology "secondary particle" means an agglomerate of two or more primary particles. A reference to "particles" that does not specify "primary" or "secondary" means primary particles, or secondary particle, or primary particles and secondary particles.

As used herein, the term "alumina" refers to any of the forms of aluminum oxide alone or as a mixture with other metals and/or metal oxides.

As used herein, the term "adsorbed" or "adsorption" shall refer collectively to the phenomena of adsorption (the ability to hold or concentrate gases, liquid or dissolved substances on the surface of the adsorbent, e.g., alumina), and absorption (the ability to hold or concentrate gases, liquids or dissolved substances throughout the body of the absorbent, e.g., alumina); either by chemical reaction which may be ionic, covalent or of mixed nature or by physical forces.

Composite Oxides

The present teachings are generally directed to inorganic oxide materials that include, among other optional materials, $Al_2O_3$, $CeO_2$, and at least one of MgO and $Pr_6O_{11}$, in various relative amounts. The inorganic oxide materials described herein are typically inorganic composite oxides. As used herein, "inorganic composite oxide" means an inorganic oxide material that comprises at least two distinct crystallographic phases by X-ray diffraction.

As used herein to describe the relative amount of a given component of a given composition, the terminology "parts by weight" of the component on the basis of 100 pbw of the given composition is equivalent to a "percent by weight" of the component on the basis of the total weight of the given composition. For example, a reference to 10 pbw of a given component per 100 pbw of a given composition is equivalent in meaning to a reference 10 wt % of the component in the composition.

Unless otherwise indicated, the relative amounts of the respective oxides of aluminum, cerium, and other elements of the composite oxide compositions described herein are each expressed on the basis of the discrete binary oxide of the respective element (for example, for aluminum as $Al_2O_3$, for cerium as $CeO_2$, for magnesium as MgO, for praseodymium as $Pr_6O_{11}$, for yttrium as $Y_2O_3$, for lanthanum as $La_2O_3$, for neodymiun as $Nd_2O_3$, and for gadolinium as $Gd_2O_3$).

In one embodiment, the composite oxide of the present teachings comprises one or more oxides of aluminum in an amount, expressed as pbw $Al_2O_3$ per 100 pbw of the composite oxide, from about 25 to 90 pbw, more typically from about 40 to 80 pbw, and even more typically from about 50 to 80 pbw, $Al_2O_3$. The aluminum oxide component of the inorganic oxide of the present teachings may be amorphous or crystalline.

In one embodiment, the composite oxide of the present teachings comprises one or more oxides of cerium in an amount, expressed as pbw $CeO_2$ per 100 pbw of the composite oxide, from about 5 to 35 pbw, more typically from about 10 to 30 pbw, and even more typically from about 10 to 20 pbw, $CeO_2$.

In one embodiment, the composite oxide of the present teachings comprises one or more oxides of magnesium in an amount, expressed as pbw MgO per 100 pbw of the composite oxide, from about 5 to 35 pbw, more typically from about 10 to 30 pbw, and even more typically from about 15 to 25 pbw, MgO. In some embodiments, the inorganic composite oxide comprises one or more oxides of magnesium, wherein at least a portion of the oxides of magnesium are present in the form of crystallites of magnesium aluminate spinel, according to the formula $MgAl_2O_4$.

In one embodiment, the composite oxide of the present teachings comprises one or more oxides of praseodymium in an amount, expressed as pbw $Pr_6O_{11}$ per 100 pbw of the composite oxide, from about 2 to 20 pbw, more typically from about 5 to 15 pbw, and even more typically, from about 5 to 10 pbw, $Pr_6O_{11}$. In some embodiments, the inorganic composite oxide comprises one or more oxides of praseodymium, wherein at least a portion of the oxides of praseodymium are present in the form of crystallites of praseodymium aluminate, according to the formula $Pr_xAl_{2-x}O_3$, wherein $0<x<2$, more typically as $PrAlO_3$.

In one embodiment, the composite oxide of the present teachings include oxides of aluminum, cerium, at least one of magnesium and praseodymium, and optionally oxides of one or more dopants selected from transition metals, rare earths, and mixtures thereof, each in an amount, expressed as pbw of the discrete binary oxide of the respective element per 100 pbw of the composite oxide of:

(a) from about 25 to about 90 pbw, more typically from about 40 to about 80 pbw, $Al_2O_3$,
(b) from about 5 to about 35 pbw, more typically from about 10 to about 30 pbw, $CeO_2$,
(c)(i) from about 5 to about 35 pbw, more typically from about 10 to about 30 pbw MgO, or
(c)(ii) from about 2 to about 20 pbw, more typically from about 5 to about 15 pbw $Pr_6O_{11}$, or
(c)(iii) from about 5 to about 35 pbw, more typically from about 10 to about 30 pbw MgO, and from about 2 to about 20 pbw, more typically from about 5 to about 15 pbw $Pr_6O_{11}$; and
(d) optionally, up to about 10 pbw of a combined amount of oxides of one or more dopants selected from transition metals, rare earths, and mixtures thereof.

The oxides of the dopant elements may each independently be present as discrete oxides of the respective dopant element, as a component in the oxides of aluminum, cerium, magnesium or praseodymium, and/or one or more of the other dopant elements. Suitable dopant elements include yttrium (Y), lanthanum (La), neodymium (Nd), samarium (Sa) europium (Eu), gadolinium (Gd), terbium (Tb), dysprosium (Dy), holmium (Ho), erbium (Er), thulium (Tm), ytterbium (Yb), lutetium (Lu), and scandium (Sc). In one embodiment, the inorganic oxide comprises oxides of one or more of Y, La, Nd, and Gd.

In one embodiment, the amount of oxides of one or more dopant elements in the inorganic composite oxide of the present teachings, expressed as pbw of the combined amount of the discrete binary oxides of the respective dopant elements per 100 pbw of the composite oxide, is from greater than 0 to about 15 pbw, more typically from about 1 to 12 pbw, and even more typically, from about 2 to 10 pbw of the oxides of one or more dopant elements.

In one embodiment, the composite oxide described herein comprises oxides of aluminum, cerium, at least one of magnesium and praseodymiun, and optional dopants (such as lanthanum, neodymium, gadolinuim and/or yttrium) wherein:
the combined amount of $La_2O_3$, $Nd_2O_3$, $Gd_2O_3$ and/or $Y_2O_3$ is greater than or equal to 2 pbw per 100 pbw of $Al_2O_3$, and
the combined amount of MgO and $Pr_6O_{11}$, is greater than or equal to 2 pbw per 100 pbw of $Al_2O_3$, and the composite oxide exhibits improved aluminum oxide phase stability.

In one embodiment, the inorganic composite oxide described herein comprises oxides of Al, Ce, Pr, and Y, oxides of Al, Ce, Pr, and La, oxides of Al, Ce, Pr, and Nd, oxides of Al, Ce, Pr, and Sa, oxides of Al, Ce, Pr, and Eu, oxides of Al, Ce, Pr, and Gd, oxides of Al, Ce, Pr, and Tb, oxides of Al, Ce, Pr, and Dy, oxides of Al, Ce, Pr, and Ho, oxides of Al, Ce, Pr, and Er, oxides of Al, Ce, Pr, and Tm, oxides of Al, Ce, Pr, and Yb, oxides of Al, Ce, Pr, and Lu, or oxides of Al, Ce, Pr, and Sc.

In one embodiment, the inorganic composite oxide described herein comprises oxides of Al, Ce, Mg, and La, oxides of Al, Ce, Mg, and Nd, oxides of Al, Ce, Mg, and Sa, oxides of Al, Ce, Mg, and Eu, oxides of Al, Ce, Mg, and Gd, oxides of Al, Ce, Mg, and Tb, oxides of Al, Ce, Mg, and Dy, oxides of Al, Ce, Mg, and Ho, oxides of Al, Ce, Mg, and Er, oxides of Al, Ce, Mg, and Tm, oxides of Al, Ce, Mg, and Yb, oxides of Al, Ce, Mg, and Lu, and oxides of Al, Ce, Mg, and Sc.

In one embodiment, the inorganic composite oxide described herein comprises oxides of Al, Ce, Mg, Pr, and La, oxides of Al, Ce, Mg, Pr, and Nd, oxides of Al, Ce, Mg, Pr, and Sa, oxides of Al, Ce, Mg, Pr, and Eu, oxides of Al, Ce, Mg, Pr, and Gd, oxides of Al, Ce, Mg, Pr, and Tb, oxides of Al, Ce, Mg, Pr, and Dy, oxides of Al, Ce, Mg, Pr, and Ho, oxides of Al, Ce, Mg, Pr, and Er, oxides of Al, Ce, Mg, Pr, and Tm, oxides of Al, Ce, Mg, Pr, and Yb, oxides of Al, Ce, Mg, Pr, and Lu, and oxides of Al, Ce, Mg, Pr, and Sc.

In one embodiment, the composite oxide of the present teachings comprises oxides of aluminum and lanthanum, wherein, with the amounts of the oxides of aluminum and lanthanum in the composite oxide each expressed as an amount of the discrete binary oxide of the respective element, the amount of $La_2O_3$ is greater than or equal to 2 pbw per 100 pbw of $Al_2O_3$, and the composite oxide exhibits improved aluminum oxide phase stability.

In one embodiment, the inorganic oxide described herein comprises oxides of Y and La, oxides of Y and Nd, oxides of Y and Gd, oxides of La and Nd, oxides of La and Gd, or oxides of La and Gd. In one embodiment, the inorganic composite oxide described herein comprises: oxides of Al, Ce, Pr, Y and Gd, oxides of Al, Ce, Pr, La and Nd, oxides of Al, Ce, Pr, La and Gd, and oxides of Al, Ce, Pr, La and Gd. In one embodiment, the inorganic composite oxide described herein comprises: oxides of Al, Ce, Mg, Y and Gd, oxides of Al, Ce, Mg, La and Nd, oxides of Al, Ce, Mg, La and Gd, and oxides of Al, Ce, Mg, La and Gd. In one embodiment, the inorganic composite oxide described herein comprises: oxides of Al, Ce, Mg, Pr, Y and Gd, oxides of Al, Ce, Mg, Pr, La and Nd, oxides of Al, Ce, Mg, Pr, La and Gd, and oxides of Al, Ce, Mg, Pr, La and Gd.

In one embodiment, the inorganic composite oxide is expressed as formula (I):

$$(Al_2O_3)_a(CeO_2)_b(MgO)_c(Pr_6O_{11})_d(M_yO_z)_e(M'_{y'}O_{z'})_f(M''_{y''}O_{z''})_g \quad (I)$$

wherein:
each of $M_yO_z$, $M'_{y'}O_{z'}$, $M''_{y''}O_{z''}$ is a binary oxide independently selected from $Y_2O_3$, $La_2O_3$, $Nd_2O_3$, $Gd_2O_3$, and other rare earth or alkaline earth metals,
coefficients a, b, c, d, e, and f reflect the respective molar amounts of the respective binary oxides, wherein:
$0.25 \leq a \leq 0.95$,
$0.05 \leq b \leq 0.15$,
$0 \leq c \leq 0.60$,
$0 \leq d \leq 0.02$,
$0 \leq e \leq 0.03$,
$0 \leq f \leq 0.03$, and
$0 \leq g \leq 0.03$,
provided that:
at least one of c or d is greater than zero,
M, M', and M" are each different elements, and
the sum of e+f+g is less than or equal to 0.1.

In some embodiments, the inorganic composite oxide is expressed as formula (I), provided that if c is less than 0.20, then d is greater than or equal to 0.002.

In some embodiments, the inorganic oxides of the present teachings exhibit crystallites of aluminum and magnesium and/or praseodymium (as well as optional dopant elements), homogenously mixed at a molecular level. Mixing of aluminum with magnesium and/or praseodymium is evidenced by X-ray diffraction analysis techniques. For example, in the case of mixing aluminum and magnesium, the existence of a crystalline phase related to the spinel type crystalline structure generally corresponds to a magnesium doped alumina. The inorganic oxides of the present teachings also exhibit the presence of crystallites of $CeO_2$. The discrete crystallites of $CeO_2$ will be evident as a crystalline phase related to the fluorite type crystalline structure. In some embodiments, the crystallites of $CeO_2$ will be doped with praseodymium.

In one embodiment, the inorganic oxide comprises a porous alumina structure having a surface area, where the porous alumina structure comprises oxides of alumina and, optionally, oxides of one or more associated dopant elements. The inorganic oxide further comprises structures, typically nanoparticles, comprising aluminum oxide and at least one of magnesium oxide or praseodymium oxide, and, optionally, oxides of one or more associated dopant elements, supported on the surface of the porous alumina structure. The inorganic oxide also comprises structures, typically nanoparticles, comprising cerium oxide also supported on the surface of the porous alumina structure. In some embodiments, the cerium oxide nanoparticles also comprise praseodymium oxide.

In one embodiment, the structures are nanoparticles having, after calcination at 1000° C. for 4 hours, a particle diameter or longest characteristic dimension of from about 10 to about 50 nm, more typically, from about 12 to about 35 nm. In one embodiment, the structures are nanoparticles having, after calcination at 1100° C. for 4 hours, a particle diameter or longest characteristic dimension of from about 10 to about 50 nm, more typically, from about 15 to about 40 nm. Particle diameter or longest characteristic dimension is measured via XRD line broadening.

In one embodiment, the structures are nanoparticles comprising $CeO_2$ and having, after calcination at 1000° C. for 4 hours, a particle diameter or longest characteristic dimension of from about 3 to about 20 nm, more typically, from about 5 to about 15 nm. In one embodiment, the structures are nanoparticles comprising $CeO_2$ and having, after calcination at 1100° C. for 5 hours, a particle diameter or longest characteristic dimension of from about 10 to about 30 nm, more typically, from about 12 to about 20 nm.

In one embodiment, the structures are nanoparticles comprising $Al_2O_3$ and MgO and having, after calcination at 1000° C. for 4 hours, a particle diameter or longest characteristic dimension of from about 2 to about 20 nm, more typically, from about 5 to about 15 nm. In one embodiment, the structures are nanoparticles comprising $Al_2O_3$ and MgO and having, after calcination at 1100° C. for 5 hours, a particle diameter or longest characteristic dimension of from about 25 to about 50 nm, more typically, from about 30 to about 45 nm.

In one embodiment, the structures are nanoparticles comprising $Al_2O_3$ and $Pr_6O_{11}$ and having, after calcination at 1000° C. for 4 hours, a particle diameter or longest characteristic dimension of from about 25 to about 50 nm, more typically, from about 30 to about 40 nm. In one embodiment, the structures are nanoparticles comprising $Al_2O_3$ and $Pr_6O_{11}$ and having, after calcination at 1100° C. for 5 hours, a particle diameter or longest characteristic dimension of from about 25 to about 50 nm, more typically, from about 30 to about 45 nm.

In one embodiment, the inorganic oxides described herein are in the form of powder having an average particle size of from about 1 to 200 micrometers ("μm"), more typically from 10 to 100 μm; or in the form of beads having an average particle size of from 1 millimeter ("mm") to 10 mm. Alternately, inorganic oxide can be in the form of pellets or extrudate (e.g., cylindrical in shape), with the size and particular shape being determined by the particular application contemplated.

In one embodiment, the inorganic composite oxides described herein exhibit a high specific surface area having good thermal stability. In one embodiment, the inorganic composite oxides described herein exhibit a BET specific surface area of greater than about 150 $m^2$/g, typically greater than about 160 $m^2$/g, more typically greater than about 165 $m^2$/g after calcining at 900° C. for 2 hours. In one embodiment, the inorganic composite oxides described herein exhibit a BET specific surface area of greater than about 85 $m^2$/g, typically greater than about 90 $m^2$/g, more typically greater than about 95 $m^2$/g after calcining at 1000° C. for 4 hours. In one embodiment, the inorganic composite oxides described herein exhibit a BET specific surface area of greater than about 40 $m^2$/g, typically greater than about 50 $m^2$/g, more typically greater than about 55 $m^2$/g after calcining at 1100° C. for 5 hours. In one embodiment, the inorganic composite oxides described herein include MgO and exhibit a BET specific surface area of greater than about 160 $m^2$/g after calcining at 900° C. for 2 hours. In another embodiment, the inorganic composite oxides described herein include MgO and exhibit a BET specific surface area of greater than about 50 $m^2$/g after calcining at 1100° C. for 5 hours. In one embodiment, the inorganic composite oxides described herein include $Pr_6O_{11}$ and exhibit a BET specific surface area of greater than about 200 $m^2$/g after calcining at 900° C. for 2 hours. In another embodiment, the inorganic composite oxides described herein include $Pr_6O_{11}$ and exhibit a BET specific surface area of greater than about 80 $m^2$/g after calcining at 1100° C. for 5 hours. BET specific surface area is measured using a nitrogen adsorption technique.

In one embodiment, the inorganic composite oxides described herein exhibit a pore volume having good thermal stability. In one embodiment, the inorganic composite oxides described herein exhibit a pore volume of greater than about 1.00 $cm^3$/g, typically, greater than about 1.10 $cm^3$/g, more typically greater than about 1.20 $cm^3$/g after calcining at 900° C. for 2 hours. In one embodiment, the inorganic composite oxides described herein include MgO and exhibit a pore volume of greater than about 1.10 $cm^3$/g after calcining at 900° C. for 2 hours. In one embodiment, the inorganic composite oxides described herein include $Pr_6O_{11}$ and exhibit a pore volume of greater than about 1.50 $cm^3$/g after calcining at 900° C. for 2 hours. Pore volume is measured using nitrogen adsorption through a Barret-Joyner-Halenda (BJH) method.

In one embodiment, the inorganic composite oxides described herein exhibit an average pore diameter of at least about 15.0 nm, typically at least about 17.5 nm, more typically at least about 20 nm after calcining at 900° C. for 2 hours. Average pore diameter is also measured using nitrogen adsorption through a Barret-Joyner-Halenda (BJH) method.

In some embodiments, the present teachings provide an inorganic oxide material which includes:
(a) a porous support structure including $Al_2O_3$;
(b) first crystallites including $CeO_2$ and having an average size after calcining at 1000° C. for 4 hours of less than or equal to 15 nm dispersed on the support structure; and
(c) second crystallites including
  (i) magnesium and aluminum composite oxides having an average size after calcining at 1000° C. for 4 hours of less than or equal to 13 nm dispersed on the support structure,
  (i) praseodymium and aluminum composite oxides having an average size after calcining at 1000° C. for 4 hours of less than or equal to 39 nm dispersed on the support structure, or
  (iii) a combination of (i) and (ii);

wherein the inorganic oxide material has a specific surface area after calcining at 900° C. for 2 hours of greater than or equal to 150 m²/g and a total pore volume after calcining at 900° C. for 2 hours of greater than or equal to 1.0 cc/g. In certain embodiments, the first crystallites also include praseodymium oxide.

The inorganic oxide described herein exhibits improved phase stability. That is, in some embodiments, the inorganic composite oxide exhibits minimal phase separation upon prolonged aging at high temperature. In some embodiments, the inorganic composite oxide exhibits minimal phase separation after aging at 1100° C. for 5 hours. In some embodiments, the inorganic composite oxide exhibits minimal phase separation after aging at 1200° C. for 5 hours. Phase separation can be identified, for example, by observing peak splitting in the X-Ray Diffraction (XRD) spectrum.

Methods

The porous inorganic composite oxides of the present teachings are made by reaction of aluminum precursor materials, cerium precursor materials, magnesium precursor materials and/or praseodymium precursor materials, and optional dopant precursor materials in an aqueous medium. As referred to herein, an aqueous medium is a medium comprising water and which may optionally further comprise one or more water soluble organic liquids such as for example, lower alkanols, such as methanol, ethanol, propanol and butanol, lower glycols, such as ethylene glycol and propylene glycol, and lower ketones, such as acetone and methyl ethyl ketone.

Figure 1:
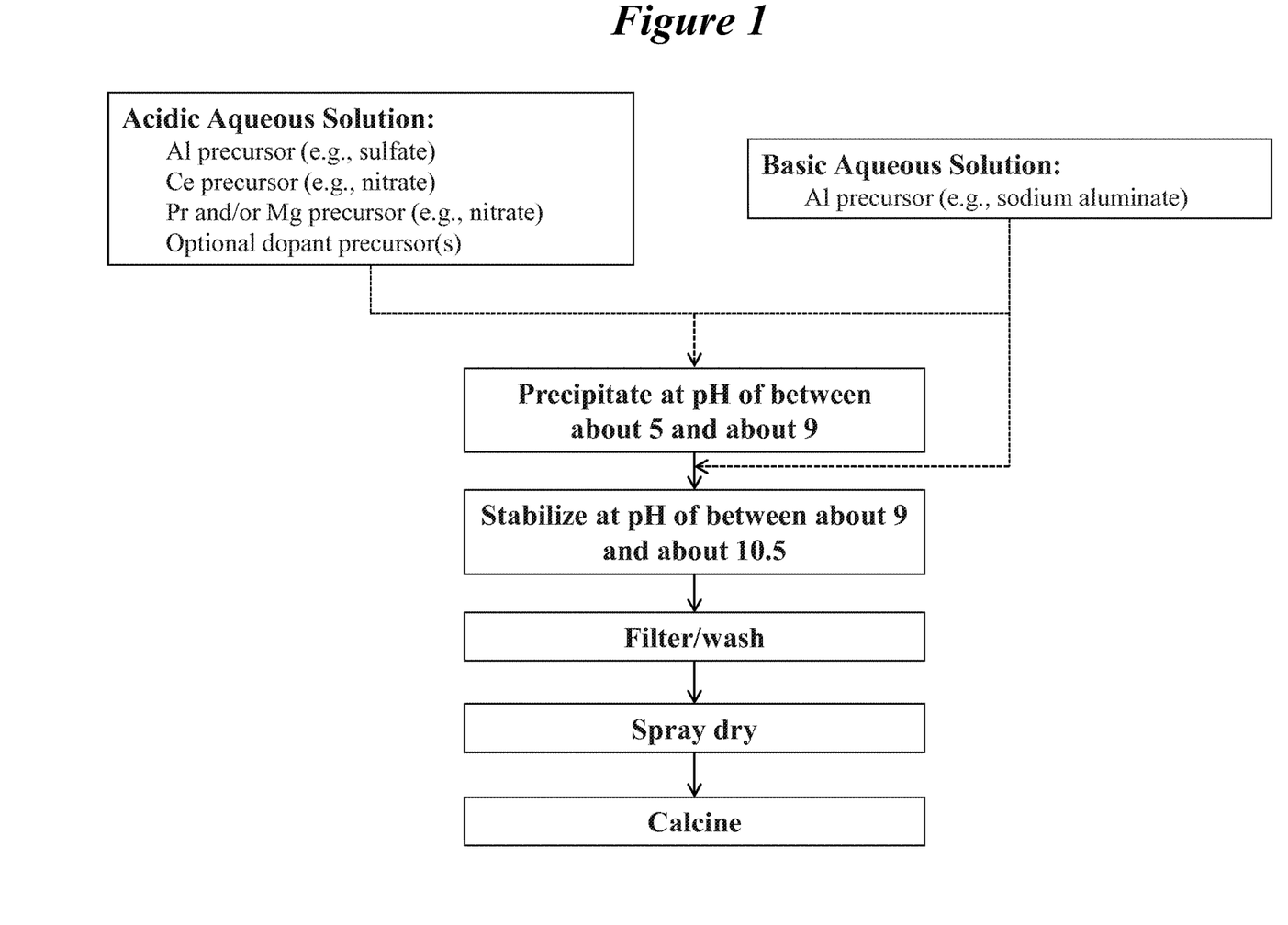
FIG. 1 is a flow diagram representing an exemplary method for forming materials of the present teachings.
Figure 2:
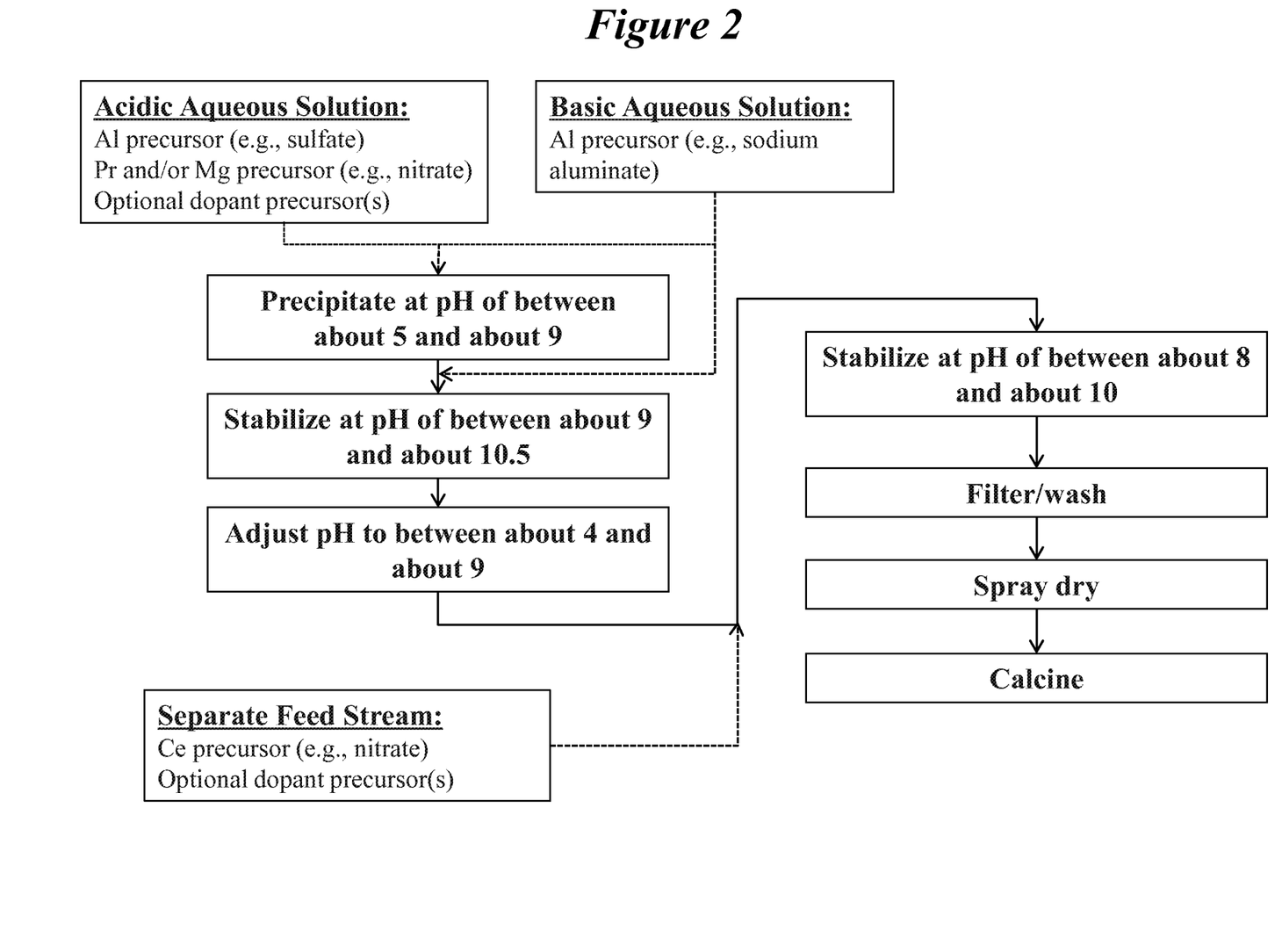
FIG. 2 is a flow diagram representing an additional exemplary method for forming materials of the present teachings.

Flow diagrams, which schematically represent exemplary methods for forming inorganic composite oxides, are provided in FIGS. 1 and 2. In one embodiment, particles are formed by contacting an aqueous acidic metal precursor composition comprising one or more aluminum precursor materials, at least one of magnesium precursor materials and/or praseodymium precursor materials, and optional dopant precursor materials, with an aqueous basic metal precursor composition comprising one or more aluminum precursor materials at a pH of from about 4 to about 10.5, typically from about 5 to about 9, and a temperature of at least about 40° C., typically from about 50° C. to about 100° C., more typically from about 50° C. to about 75° C. Cerium precursor materials and optional additional dopant precursor materials are also introduced. For example, cerium precursor materials and optional additional dopant precursor materials may be present in the aqueous acidic metal precursor composition. Optionally, these precursor materials may be in a separate feed stream, introduced during the formation of the aluminum oxide. These precursor materials may also be in a separate feed stream, introduced subsequent to the formation of the aluminum oxide. It is to be understood that, in any given synthesis, some precursor materials may be present in the aqueous acidic metal precursor composition while others may be in one or more separate feed streams.

The pH is then adjusted to a pH of from about 8 to about 12, typically from about 9 to about 10.5, by addition of a base, such as ammonium hydroxide, sodium hydroxide, or a basic metal precursor.

When cerium precursor materials and optional dopant precursor materials are introduced subsequent to the formation of a hydrated aluminum oxide, the pH of the aqueous slurry of hydrated aluminum oxide particles is typically adjusted to a pH of from about 4 to about 9, typically from about 4 to about 6, with acid (such as nitric acid, sulfuric acid, or acetic acid) prior to the addition of the cerium precursor and/or dopant element precursor. The cerium precursor and/or dopant element precursor is then added to the reaction vessel under continuous agitation. The pH is again adjusted to a pH of from about 8 to about 12, typically from about 8 to about 10, by addition of a base, such as ammonium hydroxide, sodium hydroxide, or a basic metal precursor.

Mixing of precursor materials typically occurs over a time period of from about 5 minutes to about 10 hours, typically from about 5 minutes to about 6 hours, more typically from about 15 minutes to about 60 minutes. Mixing, as used in this paragraph, is intended to include the act of combining all precursor materials as well as the subsequent mixing of the combined materials.

The aluminum precursor material will depend upon the method for making the aluminum oxide. Hydrated aluminum oxide, such as, for example, $Al(OH)_3$, boehmite, gibbsite, or bayerite, or a mixture thereof, is formed in an aqueous medium. The hydrated aluminum oxide can be formed in the aqueous medium from water soluble aluminum salts by a variety of known methods, such as, for example, by adding ammonium hydroxide to an aqueous solution of an aluminum halide, such as aluminum chloride, or by reacting aluminum sulfate with an alkali metal aluminate, such as sodium aluminate, in the aqueous medium. Suitable water soluble aluminum salts comprise an aluminum cation, such as $Al^{3+}$, and a negatively charged counterion or an aluminum-containing anion, such as $Al(OH)_4^-$, and a positively charged counterion. In one embodiment, the water soluble water aluminum salts comprise one or more water soluble aluminum salts that each independently comprise an aluminum cation and a negatively charged counterion, such as, for example aluminum halide salts or aluminum sulfate salts. In another embodiment, the water soluble aluminum salts comprise one or more water soluble aluminum salts that each independently comprise an aluminum anion and a positively charged counterion, such as for example, water soluble alkali metal aluminate salts. In another embodiment, the water soluble aluminum salts comprise one or more water soluble aluminum salts that each independently comprise an aluminum cation and a negatively charged counterion, and one or more water soluble aluminum salts that each independently comprise an aluminum anion and a positively charged counterion.

Precursor materials for metal oxides are generally known in the art. For example, suitable water soluble cerium precursors include cerous nitrate, ceric nitrate, cerous sulfate, ceric sulfate, and ceric ammonium nitrate, as well as mixtures thereof, such as mixtures of cerous nitrate and ceric nitrate. Suitable magnesium precursor materials include, for example, magnesium acetate, magnesium nitrate, magnesium hydroxide, and mixtures thereof. Suitable praseodymium precursor materials include, for example, praseodymium nitrate, praseodymium chloride, praseodymium acetate, as well as mixtures thereof.

The acidity of the aqueous acidic precursor composition and the aqueous basic precursor composition can optionally be adjusted over a wide range, through addition of acid or base. For example, an acid, such as nitric acid, hydrochloric acid, sulfuric acid, or a mixture thereof, may be added to increase the acidity of the precursor composition or a base, such as sodium hydroxide, potassium hydroxide or a mixture thereof, may be added to decrease the acidity of the precursor composition. In one embodiment, the acidity of the precursor composition is adjusted prior to introduction of the precursor composition into the reactor by adding acid to the precursor composition. In one embodiment, the acidity of the precursor composition is adjusted prior to introduction of the precursor composition into the reactor by adding base to the precursor composition.

A given dopant element is typically introduced to the porous inorganic composite oxide by adding a dopant element precursor, typically a water soluble salt of the desired dopant element. Suitable dopant element precursors include water soluble salts of the relevant dopant element, such as, for example, yttrium nitrate, yttrium chloride, yttrium acetate, lanthanum nitrate, lanthanum chloride, lanthanum acetate, neodymium nitrate, neodymium chloride, neodymiun acetate, gadolinium nitrate, gadolinium chloride, gadolinium acetate, and mixtures thereof.

The cerium and/or dopant elements may also be introduced as a colloidal dispersion of the element in a solvent, wherein the solvent might contain additional ions for dispersion stabilization. To ensure good stability of the colloidal suspension and to obtain high dispersion of the element within the porous inorganic composite oxide, the size of the colloids is preferably between 1 and 100 nm. The cerium and/or dopant elements may be introduced to the reaction mixture simultaneously as the element in the form of colloidal particles of the element and as an aqueous solution of ionic species of the element.

In one embodiment, the aqueous solution containing the precipitated materials comprising aluminum, cerium, magnesium, praseodymiun, and/or dopant element hydrates is heated to a temperature above ambient temperature, more typically to a temperature of from about 50° C. to about 200° C. for a time period of from about 20 minutes to about 6 hours, more typically from about 20 minutes to about 1 hour. For temperatures greater than 100° C., the heating is conducted in a pressure vessel at a pressure of greater than atmospheric pressure.

The precipitated materials comprising aluminum, cerium, magnesium, praseodymiun, and/or dopant element hydrates are then isolated from the aqueous medium, typically by filtration. In one embodiment, prior to isolation of the particles from the aqueous medium, the pH of the suspension of particles in the aqueous medium is adjusted to a pH of from about 6 to about 7.5, by the introduction of acid, typically an acid comprising nitric acid, sulfuric acid, or acetic acid, to the suspension.

In one embodiment, the particles are washed to remove residues. In one embodiment, prior to isolation of the particles from the aqueous medium, one or more water soluble salts are added to the suspension of particles in the aqueous medium in order to improve washing efficiency. Suitable water soluble salts include, for example, ammonium nitrate, ammonium sulfate, ammonium hydroxide, ammonium carbonate, potassium carbonate, sodium carbonate, aluminum bicarbonate, and mixtures thereof.

The washing may be conducted using hot water and/or an aqueous solution of a water-soluble ammonium salt such as, for example, ammonium nitrate, ammonium sulfate, ammonium hydroxide, ammonium carbonate, potassium carbonate, sodium carbonate, ammonium bicarbonate, and the like or mixtures thereof. In one embodiment of the washing step, the slurry of aluminum hydrate particles or metal oxide-clad aluminum hydrate particles is dewatered, then washed with an aqueous solution of water-soluble ammonium salt, then dewatered, then washed with water, and then dewatered again to form a wet cake of washed particles. In one embodiment, the wet cake of washed particles is re-dispersed in water to form a second aqueous slurry.

In one embodiment, the second aqueous slurry is then spray dried to particles of aluminum hydrate or metal precursor-contacted aluminum hydrate. In another embodiment, the pH of the second aqueous slurry is adjusted to a pH of from about 4 to about 9, more typically of from about 6 to about 8.5, by the introduction of acid (for example nitric acid, sulfuric acid, or acetic acid) or base (for example sodium hydroxide) to the second aqueous slurry. In one embodiment, the pH adjusted second slurry is then heated to a temperature above ambient temperature, more typically to a temperature of from about 50° C. to about 200° C., even more typically to a temperature of from about 80° C. to about 200° C. for a time period of from about 20 minutes to about 6 hours, more typically from about 20 minutes to about 1 hour. For temperatures greater than 100° C., the heating is conducted in a pressure vessel at a pressure of greater than atmospheric pressure. The particles of the pH adjusted second slurry are then isolated from the aqueous medium of the second slurry. In one embodiment, the particles of isolated from the second slurry are redispersed in water to form a third aqueous slurry and the third aqueous slurry is spray dried.

The isolated or the isolated, redispersed, and spray dried particles are then calcined to form the inorganic composite oxides described in more detail above. In one embodiment, the particles are calcined at elevated temperature, typically from 400° to 1100° C., for greater than or equal to about 30 minutes, more typically from about 1 to about 5 hours, to form the porous inorganic compo site oxide product. The calcination can be conducted in air, or nitrogen, optionally in the presence of up to about 20% water vapor. In one embodiment, the particles of inorganic oxide are calcined at greater than or equal to 400° C., more typically from about 600 to about 1100° C. for greater than or equal to 1 hour, more typically from about 2 to about 4 hours.

Catalysts

The porous inorganic composite oxides of the present teachings, especially when in the form of a powder of from 1 to 200 μm, more typically from 10 to 100 μm, can be further used as a catalytic coating on a low surface area substrate. The substrate structure can be chosen from a variety of forms for a particular application. Such structural forms include monoliths, honeycomb, wire mesh and the like. The substrate structure is normally formed of a refractory material such as, for example, alumina, silica-alumina, silica-magnesia-alumina, zirconia, mullite, cordierite, as well as wire mesh and the like. Metallic honeycomb substrates can also be used. The powder is slurried in water, peptized by the addition of a small amount of acid (typically mineral acids), and then subjected to milling to cause a reduction in particle size suitable for washcoating application. The substrate structure is contacted with the milled slurry, such as by dipping the substrate into the slurry. The excess material is removed, such as by application of blown air, followed by calcining the coated substrate structure to cause adhesion of the (wash-coat) inorganic composite oxide particulates described above to the substrate structure.

Noble metals, usually the metals of the platinum group, such as platinum, palladium, rhodium and mixtures thereof, can be applied in manners well known to those skilled in this art, either before wash-coating the particulate inorganic composite oxide using a suitable conventional noble metal precursor (acidic or basic), or after washcoating by dipping the washcoated substrate in a suitable noble-metal precursor solution (either acidic or basic). More typically the porous inorganic composite oxide is formed, followed by application of the noble metal thereto, and finally, wash-coating the inorganic composite oxide supported catalyst material onto a substrate. The porous inorganic composite oxides described herein may also be mixed with one or more other oxide supports (including, but not limited to alumina, magnesia, ceria, ceria-zirconia, rare-earth oxide-zirconia mixtures) and then wash-coated with these products onto a substrate.

In addition to the noble metal catalyst material, the inorganic composite oxides of the present teachings can also support various $NO_x$ storage materials. $NO_x$ traps function to lower the level of nitrogen oxides in exhaust gas. Nitrogen oxides, produced when the engine is running in an oxygen rich state, can react with oxygen on oxidation catalyst sites to form $NO_2$, which is adsorbed by $NO_x$ storage material. When the engine then switches to fuel rich conditions, the stored nitrogen oxide can react with reducing species (e.g., hydrocarbons, CO, and $H_2$) on reduction catalyst sites to form innocuous $N_2$, which is then eliminated from the system. This then frees up the $NO_x$ storage material for absorption during the next oxygen rich cycle. Suitable $NO_x$ storage materials include, but are not limited to alkali and alkaline earth metals, $K_2O$ and BaO. The $NO_x$ storage materials can be applied in manners similar to the noble metal, and also well known to those skilled in this art, either before or after wash-coating the particulate inorganic composite oxide.

The inorganic composite oxides described herein offer appropriate flexibility of composition within a unique and highly durable structural matrix to provide specific, tailored synergetic benefits for a range of emission applications. For example, in some embodiments, the inorganic composite oxides of the present teachings may serve as a conventional oxide support for precious group metals, as described in more detail above (e.g., Pd in a three-way catalyst). In this application, the dopant ions of the oxide can stabilise the metal dispersion, enhance activity by boosting local redox function, and limit transient poisoning of the platinum group metal (PGM), e.g., by sulfur-containing transients. In other exemplary embodiments, the inorganic composite oxides of the present teachings may serve as regenerable NOx storage/release catalysts (a.k.a. NOx traps). In these applications, the matrix of stable dispersed cations can provide a high specific area of adsorption sites for NO and $NO_2$, which offers increased resistance to deactivation via conventional hydrothermal sintering mechanisms. Similarly, in still other exemplary embodiments, the inorganic composite oxides of the present teachings may serve as NOx scavengers. In this application, the materials can operate in synergy with conventional urea-SCR catalysts to provide low temperature NOx scavenging during 'cold' conditions, when the required hydrolysis of urea to ammonia is unfavourable. Without wishing to be bound by any particular theory, it is believed that the key feature that makes the inorganic composite oxides of the present teachings particularly suitable for the above applications is the ability of the Al-containing structure to provide a host matrix into which catalytically active ions may be introduced at high dispersion, activity and stability.

The catalyst made using the inorganic composite oxides described herein can be directly loaded into canisters and the like either alone or in combination with other materials as part of the exhaust emission system of an internal combustion engine. Thus, the exhaust products, which normally comprise oxygen, carbon monoxide, carbon dioxide, hydrocarbons, nitrogen oxides, sulfur, sulfurous compounds and sulfur oxides, are passed through the exhaust system to provide contact with the noble-metal supported catalyst. The result provides conversion of the noxious and harmful exhaust products into more environmentally acceptable materials. When using a catalyst formed with an inorganic composite oxide described herein, one achieves a catalyst system having extended active term and high overall activity. The inorganic composite oxides of the present teachings also provide improved thermal stability, as well as small, thermally stable $CeO_2$ crystallites, improved oxygen storage capacity, improved $NO_x$ storage capacity, and in some embodiments, improved sulfur tolerance.

The present teachings are also directed to a method for treating an exhaust gas from an internal combustion engine using the catalyst described herein. The method generally includes contacting the exhaust gas with the catalyst such that the exhaust gas is treated (e.g., such that the amount of unburnt hydrocarbons, CO, $NO_x$, and/or sulfurous compounds in the exhaust gas is decreased). In some embodiments, CO, NOx, unburnt hydrocarbon, or any combination thereof, from the exhaust gas is eliminated.

It is to be understood that any range of numbers recited in the specification or claims, such as representing a particular set of properties, units of measure, conditions, physical states or percentages, is intended to literally incorporate expressly herein by reference or otherwise, any number falling within such range, including any subset of numbers within any range so recited.

The following examples are given as specific illustration of the claimed invention. It should be understood, however, that the invention is not limited to the specific details set forth in the examples. All parts and percentages in the examples and in the remainder of the specification are by weight unless otherwise specified.

EXAMPLES

Unless otherwise specified, the composition of each of the composite oxides of Examples 1 and 2 is given as relative amounts of oxides of aluminum, cerium, magnesium and/or praseodymium, and any optional dopant elements in the composite oxide, based on the combined amount of oxides of aluminum, cerium, magnesium and/or praseodymium, and any optional dopant elements in the composite oxide, each expressed as an amount of the discrete binary oxide of the respective element. Unless otherwise specified, the calcinations referred to in the various Examples were conducted in air.

Analytical results for the compositions of Examples 1 and 2 are reported in TABLE I below, as pore volume after calcination at 900° C. for 2 hr (PV 900° C./2 h ($cm^3$/g)), surface area after calcination at 900° C. for 2 hr (SA 900° C./2 h ($m^2$/g)), surface area after calcination at 1000° C. for 4 hr (SA 1000° C./4 h ($m^2$/g)), surface area after calcination at 1100° C. for 5 hr (SA 1100° C./5 h ($m^2$/g)), oxide crystallite size after calcination at 1000° C. for 5 hr (Fcryst 1000° C./5 h (nm)), and oxide crystallite size after calcination at 1100° C. for 5 hr (Fcryst 1100° C./5 h (nm)). Unless otherwise specified, pore volume and BET specific surface areas were determined by Nitrogen adsorption techniques using a Micromeretics Tristar 3000 apparatus. Pore volume data were collected using 91 measurement points between P/P0=0.01 and P/P0=0.998. Specific Surface Areas (SA) are reported in square meters per gram ($m^2$/g), Pore Volumes are reported in cubic centimeters per gram ($cm^3$/g), calcination temperatures are reported in degrees Centigrade (° C.) and times are reported in hours (hr).

Example 1

The composite oxide of Example 1 contained, based on 100 pbw of the composite oxide, 79.6 pbw of $Al_2O_3$, 12.0 pbw of $CeO_2$, and 7.8 pbw of $Pr_6O_{11}$, and was made using the following precursors aqueous solutions: aluminum sulfate (concentration 8.3 wt % as $Al_2O_3$), sodium aluminate (concentration 24.9 wt % as $Al_2O_3$), cerium nitrate (concentration 19.4 wt % as $CeO_2$), and praseodymium nitrate (concentration 27.0 wt % as $Pr_6O_{11}$).

An acidic solution (solution A) was made by mixing together aluminum sulfate, cerium nitrate, praseodymium nitrate, and 192.1 g of deionized water with respect to a total oxide basis of 60 grams for the final material. The temperature in the reactor was maintained at 65° C. from the beginning of the precipitation to the filtration. Some deionized water was added to a heated 1 liter reactor equipped with an agitation mobile. A small amount of solution A was introduced under agitation into the reactor over about 5 min and then the reactor was kept under agitation for another 5 min without addition of any new materials. Afterwards the rest of solution A was introduced into the reactor under agitation over about 50 min. During the introduction of solution A at this step, the pH was regulated at a value of 5.2 by the introduction of sodium aluminate solution into the reactor. After the addition of all solution A, the flow of sodium aluminate solution was maintained so the pH reached a value of 9.8 in about 20 min.

The reactor content was then filtered and washed with an ammonium bicarbonate solution at 60° C. in a Buchner funnel to form a wet filter cake. The ammonium bicarbonate solution was prepared by dissolving 30 grams of ammonium bicarbonate per liter of deionized water at 60° C. and the volume of ammonium bicarbonate solution used for washing corresponded to twice the volume of aqueous medium in the reactor. The wet filter cake was then washed with the same volume of deionized water at 60° C. The resulting wet filter cake was then dispersed in deionized water to form a slurry containing about 10 wt % of solids. The slurry was spray dried to obtain a dried powder. The spray dried powder was then calcined at 900° C. for 2 hours and characterized. After calcination at 900° C. for 2 hours, the composite oxide was then calcined at higher temperatures for further characterization.

Example 2

The composite oxide of this example contained, based on 100 pbw of the composite oxide, 57.6 pbw of $Al_2O_3$, 2.3 pbw of $La_2O_3$, 20.0 pbw of $CeO_2$, and 19.9 pbw of MgO, and was made using the following precursors aqueous solutions: aluminum sulfate (concentration 8.3 wt % as $Al_2O_3$), sodium aluminate (concentration 24.9 wt % as $Al_2O_3$), lanthanum nitrate (concentration 27.2 wt % as $La_2O_3$) cerium nitrate (concentration 19.4 wt % as $CeO_2$), and magnesium nitrate (concentration 8.3 wt % as MgO).

An acidic solution (solution A) was made by mixing together aluminum sulfate, lanthanum nitrate, cerium nitrate, and magnesium nitrate, and 226.6 g of deionized water with respect to a total oxide basis of 95 grams for the final material. The temperature in the reactor was maintained at 65° C. from the beginning of the precipitation to the filtration. Some deionized water was added to a heated 1 liter reactor equipped with an agitation mobile. A portion of solution A was introduced under agitation into the reactor over about 5 min and then the reactor was kept under agitation for another 5 min without addition of any new materials. Afterwards the rest of solution A was introduced into the reactor under agitation over about 50 min. During the introduction of solution A at this step, the pH was regulated at a value of 9.0 by the introduction of sodium aluminate solution into the reactor. After the addition of all solution A, the flow of sodium aluminate solution was maintained so the pH reached a value of 10.3 in about 5 min.

The reactor content was then filtered and washed with an ammonium bicarbonate solution at 60° C. in a Buchner funnel to form a wet filter cake. The ammonium bicarbonate solution was prepared by dissolving 30 grams of ammonium bicarbonate per liter of deionized water at 60° C. and the volume of ammonium bicarbonate solution used for washing corresponded to twice the volume of aqueous medium in the reactor. The wet filter cake was then washed with the same volume of deionized water at 60° C. The resulting wet filter cake was then dispersed in deionized water to form a slurry containing about 10 wt % of solids. The slurry was spray dried to obtain a dried powder. The spray dried powder was then calcined at 900° C. for 2 hours and characterized. After calcination at 900° C. for 2 hours, the composite oxide was then calcined at higher temperatures for further characterization.

TABLE I

| EX # | PV, n 900° C./2 h ($cm^3/g$) | SA, 900° C./2 h ($m^2/g$) | SA, 1000° C./4 h ($m^2/g$) | SA, 1100° C./5 h ($m^2/g$) | Fcryst 1000° C./4 h (nm) | Fcryst 1100° C./5 h (nm) |
|---|---|---|---|---|---|---|
| 1 | 1.56 | 208 | 116 | 84 | $CeO_2$: 12.8 $PrAlO_3$: 35.9 | $CeO_2$: 18.6 $PrAlO_3$: 39.0 |
| 2 | 1.19 | 166 | 96 | 54 | $CeO_2$: 12.8 $MgAl_2O_4$: 10.5 | $CeO_2$: 22.0 $MgAl_2O_4$: 35.9 |

Prospective Example

Addition of Noble Metal and Catalyst Activity

In order to estimate the long-term durability of the materials synthesized in Examples 1 and 2, noble metals will be added and each resulting catalyst will be exposed to an exhaust gas for an extended period of time. Each catalyst will also be measured for three-way catalytic performance, using simulated engine exhaust gases (e.g., normal burn, fuel-lean and/or fuel rich). The three-way catalytic performance will be measured as % conversions of CO, HC and $NO_x$ at 400° C. It is expected that the catalysts will have excellent durability and excellent CO, HC and $NO_x$ conversion at steady-state operation.

The invention claimed is:
1. An inorganic oxide material, consisting of:
   $Al_2O_3$, $CeO_2$, MgO and optionally oxides of one or more dopants; or
   $Al_2O_3$, $CeO_2$, MgO, $Pr_6O_{11}$ and optionally oxides of one or more dopants;
   wherein the dopant(s) being one or more selected from the group consisting of yttrium (Y), lanthanum (La), neodymium (Nd), samarium (Sa), europium (Eu), gadolinium (Gd), terbium (Tb), dysprosium (Dy), holmium

(Ho) and erbium (Er), thulium (Tm), ytterbium (Yb), lutetium (Lu), and scandium (Sc);

with the following proportions:
(a) from about 25 to about 90 pbw $Al_2O_3$;
(b) from about 5 to about 35 pbw $CeO_2$;
(c)(i) from about 5 to about 35 pbw MgO, or
(c)(iii) from about 5 to about 35 pbw MgO, and from about 2 to about 20 pbw $Pr_6O_{11}$; and
(d) optionally up to about 10 pbw of the oxides of one or more dopants; and wherein the inorganic oxide material has:
a specific surface area after calcining at 900° C. for 2 hours of greater than or equal to 150 m²/g; or
a specific surface area after calcining at 1000° C. for 4 hours of greater than or equal to 85 m²/g; or
a specific surface area after calcining at 1100° C. for 5 hours of greater than or equal to 40 m²/g.

2. The inorganic oxide material of claim 1, wherein the material comprises from about 40 to about 80 pbw $Al_2O_3$ and from about 10 to about 30 pbw $CeO_2$.

3. The inorganic oxide material of claim 1, wherein the material comprises from about 10 to about 30 pbw MgO.

4. The inorganic oxide material of claim 1, wherein the material comprises from about 5 to about 15 pbw $Pr_6O_{11}$.

5. The inorganic oxide material of claim 1, wherein the material comprises from about 10 to about 30 pbw MgO and from about 5 to about 15 pbw $Pr_6O_{11}$.

6. The inorganic oxide material of claim 1, wherein the material comprises from about 1 to about 10 pbw of an oxide or a mixture of oxides selected from $Y_2O_3$, $La_2O_3$, $Nd_2O_3$ and $Gd_2O_3$.

7. The inorganic oxide material of claim 1, wherein the material comprises from about 1 to about 4 pbw $La_2O_3$.

8. The inorganic oxide material of claim 1, wherein the inorganic oxide material comprises (i) first crystallites comprising $Al_2O_3$ and at least one oxide selected from MgO and $Pr_6O_{11}$, and (ii) second crystallites comprising $CeO_2$, wherein the second crystallites have an average size after calcining at 1000° C. for 4 hours of less than or equal to 15 nm.

9. The inorganic oxide material of claim 1, wherein the inorganic oxide material comprises (i) first crystallites comprising $Al_2O_3$ and at least one oxide selected from MgO and $Pr_6O_{11}$, and (ii) second crystallites comprising $CeO_2$, wherein the first crystallites comprise (i) $Al_2O_3$ and MgO, and have an average size after calcining at 1000° C. for 4 hours of less than or equal to 13 nm or (ii) $Al_2O_3$ and $Pr_6O_{11}$, and have an average size after calcining at 1000° C. for 4 hours of less than or equal to 39 nm, or (iii) a combination of (i) and (ii).

10. The inorganic oxide material of claim 1, wherein the specific surface area of the inorganic oxide material after calcining at 900° C. for 2 hours is greater than or equal to about 160 m²/g.

11. The inorganic oxide material of claim 1, wherein a total pore volume of the inorganic oxide material after calcining at 900° C. for 2 hours is greater than or equal to about 1.10 cm³/g.

12. A catalyst, comprising one or more noble metals supported on the inorganic oxide material of claim 1.

13. A method for treating an exhaust gas from an internal combustion engine, the method comprising contacting the exhaust gas with the catalyst of claim 12, such that the exhaust gas is treated.

14. The method of claim 13, wherein CO, $NO_X$, unburnt hydrocarbon, or any combination thereof, from the exhaust gas is eliminated.

15. A method for making a porous inorganic composite oxide comprising the inorganic oxide material of claim 1, the method comprising:
(a) forming (i) particles comprising aluminum hydrate and at least one of magnesium hydrate and praseodymium hydrate and (ii) particles comprising cerium hydrate:
   (1) simultaneously by forming (i) and (ii) in an aqueous medium at a temperature of greater than about 40° C. and a pH of from about 4 to about 10.5, or
   (2) sequentially by forming (i) in an aqueous medium at a temperature of greater than 40° C., adjusting the pH of the aqueous medium to a pH of from about 4 to about 9, and forming (ii) in the aqueous medium; and
calcining the dried particles to form the porous inorganic composite oxide comprising the inorganic oxide material of claim 1.

* * * * *